US012776810B2

(12) United States Patent
Arai et al.

(10) Patent No.: US 12,776,810 B2
(45) Date of Patent: Oct. 27, 2026

(54) DISTRIBUTED ANTENNA SYSTEM, WIRELESS COMMUNICATION METHOD AND WIRELESS COMMUNICATION APPARATUS

(71) Applicant: NTT, Inc., Tokyo (JP)

(72) Inventors: Takuto Arai, Musashino (JP); Daisei Uchida, Musashino (JP); Tatsuhiko Iwakuni, Musashino (JP); Shuki Wai, Musashino (JP); Naoki Kita, Musashino (JP)

(73) Assignee: NTT, Inc., Tokyo (JP)

( * ) Notice: Subject to any disclaimer, the term of this patent is extended or adjusted under 35 U.S.C. 154(b) by 83 days.

(21) Appl. No.: 18/993,622

(22) PCT Filed: Jul. 26, 2022

(86) PCT No.: PCT/JP2022/028760
§ 371 (c)(1),
(2) Date: Jan. 13, 2025

(87) PCT Pub. No.: WO2024/023923
PCT Pub. Date: Feb. 1, 2024

(65) Prior Publication Data
US 2026/0269867 A1 Sep. 10, 2026

(51) Int. Cl.
*H04B 7/02* (2018.01)
*H04B 7/024* (2017.01)
*H04B 7/0452* (2017.01)

(52) U.S. Cl.
CPC ........... *H04B 7/024* (2013.01); *H04B 7/0452* (2013.01)

(58) Field of Classification Search
CPC .............................. H04B 7/024; H04B 7/0452
(Continued)

(56) References Cited

U.S. PATENT DOCUMENTS

2012/0120864 A1 * 5/2012 Miyata .................. H04B 7/024
370/312

FOREIGN PATENT DOCUMENTS

CN 1933356 A * 3/2007

OTHER PUBLICATIONS

NTT DOCOMO, Inc., "White Paper 5G Evolution and 6G", 2022.

* cited by examiner

*Primary Examiner* — Kevin M Burd

(57) ABSTRACT

A distributed antenna system including a first communication device and a plurality of antennas that communicates with a plurality of second communication devices by spatial multiplexing under control of the first communication device, the first communication device including an extraction unit that extracts a plurality of candidate, second communication devices that is candidates for spatial multiplexing among the plurality of second communication devices; and an allocation unit that allocates communication opportunities, as targets for communication by spatial multiplexing, to two or more candidate, second communication devices from among the plurality of extracted candidate, second communication devices that satisfy a condition that a distance between the candidate, second communication devices is equal to or greater than a first threshold and an overlap ratio of each antenna allocated to each candidate, second communication device is less than a second threshold, in which each antenna allocated to the two or more candidate, second communication devices to which the communication opportunities have been allocated among the plurality of antennas performs spatial multiplexing transmission with respect to the two or more candidate, second communication devices.

5 Claims, 3 Drawing Sheets

(58) Field of Classification Search
USPC .......................................................... 375/267
See application file for complete search history.

DISTRIBUTED ANTENNA SYSTEM, WIRELESS COMMUNICATION METHOD AND WIRELESS COMMUNICATION APPARATUS

CROSS-REFERENCE TO RELATED APPLICATIONS

This application is a 371 U.S. National Phase of International Application No. PCT/JP2022/028760 filed on Jul. 26, 2022. The entire disclosure of the above application is incorporated herein by reference.

TECHNICAL FIELD

The present invention relates to a distributed antenna system, a wireless communication method, and a wireless communication device.

BACKGROUND ART

In a wireless communication system, a multiple-input multiple-output (MIMO) technology is widely used as a technology capable of improving frequency utilization efficiency and greatly improving capacity and throughput. In the MIMO technology, a plurality of antennas is provided on a transmission side and a reception side, and spatial multiplexing transmission is performed at the same time and the same frequency. The MIMO includes single user MIMO (SU-MIMO) that uses a plurality of antennas in one-to-one communication, and multi-user MIMO (MU-MIMO) that performs multiple-input and multiple-output (MIMO) control between a plurality of terminals in a case where one-to-many or many-to-many communication such as a base station (BS) and a terminal (UE: user equipment) is performed.

When MIMO is performed, channel information (channel state information (CSI)) between a plurality of transmission/reception antennas is acquired, and precoding on the transmission side and postcoding on the reception side are performed to reduce inter-stream interference. MIMO using a distributed antenna system in which antennas of a base station are arranged in a distributed manner has also been widely studied as a configuration that can be expected to reduce a spatial correlation between an antenna of a base station and an antenna of a terminal (see, for example, Non Patent Literature 1). In the distributed antenna system, a clustering method for reducing a processing load by limiting the range of the distributed antennas used for each terminal has also been studied.

CITATION LIST

Non Patent Literature

Non Patent Literature 1: NTT DOCOMO, INC., "White Paper 5G Evolution and 6G", 2020 NTT DOCOMO, INC. All Rights Reserved.

SUMMARY OF INVENTION

Technical Problem

In a case where spatial correlation between transmission/reception antennas is high when spatial multiplexing transmission is performed, an effect of noise emphasis due to precoding or postcoding increases, and it is difficult to achieve sufficient communication performance. In a configuration such as a distributed antenna system in which a large number of antennas of a base station are deployed, collecting all CSI between all distributed antennas and each terminal in order to suppress interference between streams by precoding or postcoding or to schedule a terminal having a low spatial correlation leads to an increase in a band and processing load between the distributed antenna and the base station, which is not desirable from the viewpoint of communication efficiency.

In view of the above circumstances, an object of the present invention is to provide a technology capable of reducing spatial correlation in performing spatial multiplexing transmission and improving communication efficiency without acquiring CSI between all antennas.

Solution to Problem

An aspect of the present invention is a distributed antenna system including a first communication device and a plurality of antennas that communicates with a plurality of second communication devices by spatial multiplexing under control of the first communication device, the first communication device including an extraction unit that extracts a plurality of candidate, second communication devices that is candidates for spatial multiplexing among the plurality of second communication devices; and an allocation unit that allocates communication opportunities, as targets for communication by spatial multiplexing, to two or more candidate, second communication devices from among the plurality of extracted candidate, second communication devices that satisfy a condition that a distance between the candidate, second communication devices is equal to or greater than a first threshold and an overlap ratio of each antenna allocated to each candidate, second communication device is less than a second threshold, in which each antenna allocated to the two or more candidate, second communication devices to which the communication opportunities have been allocated among the plurality of antennas performs spatial multiplexing transmission with respect to the two or more candidate, second communication devices.

An aspect of the present invention is a wireless communication method in a distributed antenna system including a first communication device and a plurality of antennas that communicates with a plurality of second communication devices by spatial multiplexing under control of the first communication device, in which the first communication device extracts a plurality of candidate, second communication devices that is candidates for spatial multiplexing among the plurality of second communication devices, and allocates communication opportunities, as targets for communication by spatial multiplexing, to two or more candidate, second communication devices from among the plurality of extracted candidate, second communication devices that satisfy a condition that a distance between the candidate, second communication devices is equal to or greater than a first threshold and an overlap ratio of each antenna allocated to each candidate, second communication device is less than a second threshold, and each antenna allocated to the two or more candidate, second communication devices to which the communication opportunities have been allocated among the plurality of antennas performs spatial multiplexing transmission with respect to the two or more candidate, second communication devices.

An aspect of the present invention is a wireless communication device including: a plurality of antennas that performs spatial multiplexing transmission with respect to a plurality of communication devices; an extraction unit that extracts a plurality of candidate communication devices that is candidates for spatial multiplexing among the plurality of communication devices; and an allocation unit that allocates communication opportunities, as targets for communication by spatial multiplexing, to two or more candidate communication devices from among the plurality of extracted candidate communication devices that satisfy a condition that a distance between the candidate communication devices is equal to or greater than a first threshold and an overlap ratio of each antenna allocated to each candidate communication device is less than a second threshold, in which each antenna allocated to the two or more candidate communication devices to which the communication opportunities have been allocated among the plurality of antennas performs spatial multiplexing transmission with respect to the two or more candidate communication devices.

Advantageous Effects of Invention

According to the present invention, it is possible to reduce spatial correlation in performing spatial multiplexing transmission and improve communication efficiency without acquiring CSI between all antennas.

DESCRIPTION OF EMBODIMENTS

Hereinafter, an embodiment of the present invention will be described with reference to the drawings.

Figure 1:
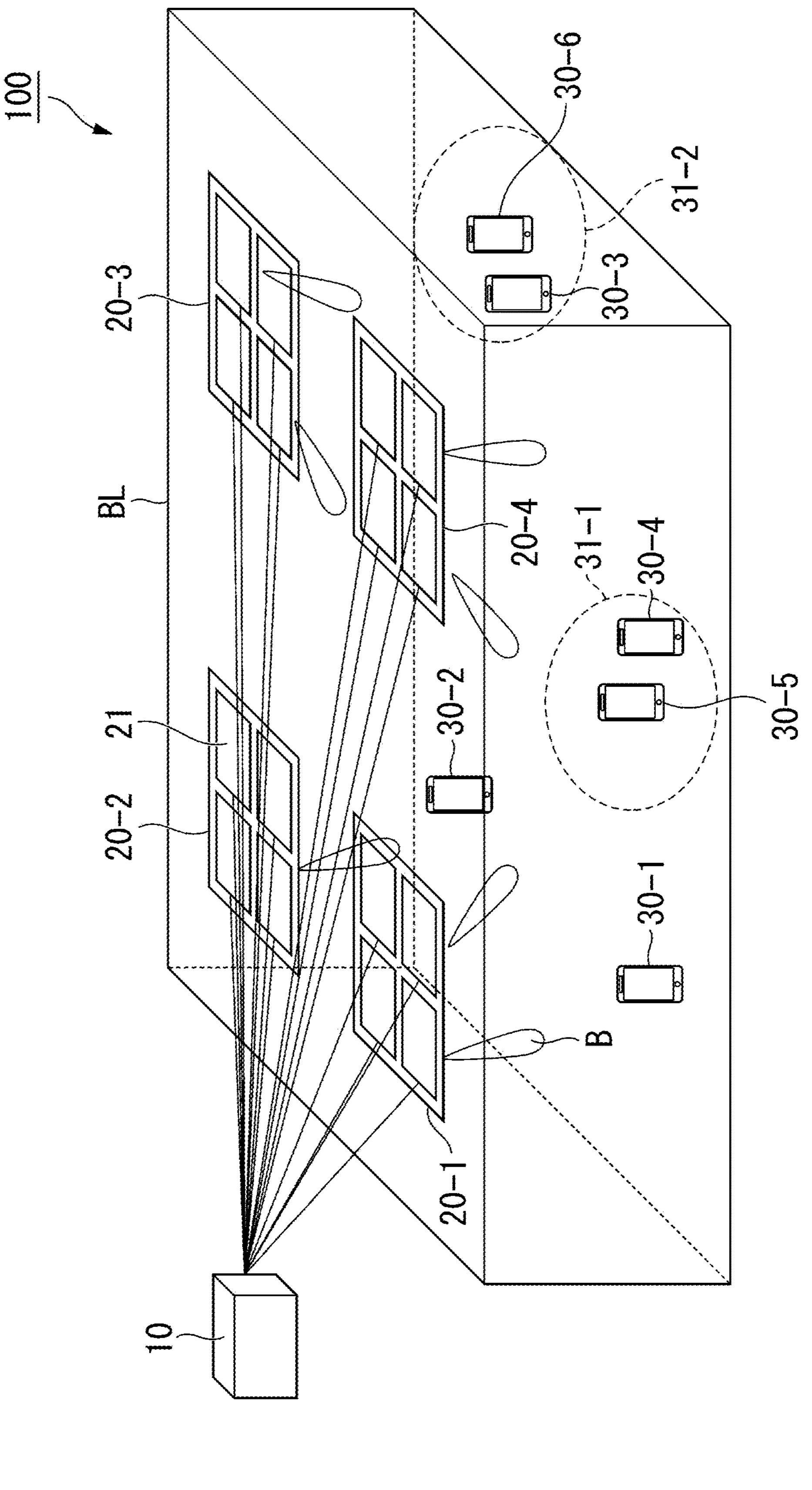
FIG. 1 A diagram illustrating an example of a distributed antenna system according to the present embodiment.

FIG. 1 is a diagram illustrating an example of a distributed antenna system 100 according to the present embodiment. The distributed antenna system 100 includes a base station 10 and a plurality of antennas 20-1 to 20-4. The base station 10 and the plurality of antennas 20-1 to 20-4 are connected by optical transmission paths. Communication between the base station 10 and the plurality of antennas 20-1 to 20-4 is performed by, for example, radio over fiber (RoF). The base station 10 and the plurality of antennas 20-1 to 20-4 are an aspect of a wireless communication device.

In an example illustrated in FIG. 1, the plurality of antennas 20-1 to 20-4 is installed on a ceiling in a building BL and communicates with a plurality of wireless communication terminals 30-1 to 30-6 located in the building BL. The plurality of antennas 20-1 to 20-4 is arranged apart from each other as illustrated in FIG. 1. Each antenna 20 includes a plurality of sub-arrays 21. Note that the numbers of antennas 20, wireless communication terminals 30, and sub-arrays 21 are not limited to the numbers illustrated in FIG. 1. In the following description, the antennas 20-1 to 20-4 will be simply referred to as antennas 20 unless otherwise distinguished.

The base station 10 controls each of the antennas 20 arranged in a distributed manner by centralized control. The base station 10 achieves communication with the plurality of wireless communication terminals 30 simultaneously by spatial multiplexing by controlling each antenna 20. Specifically, the base station 10 performs MU-MIMO by simultaneously transmitting a plurality of streams from the plurality of antennas 20 to the plurality of wireless communication terminals 30.

Each antenna 20 communicates with each wireless communication terminal 30. Each antenna 20 includes a plurality of sub-arrays 21. Each sub-array 21 emits radio waves under the control of the base station 10. The antenna 20 communicates with the wireless communication terminal 30, which is a communication target, by performing beamforming using a plurality of array elements to secure a gain in a high frequency band. Note that some of the antennas 20 may not include the sub-array 21.

Each wireless communication terminal 30 includes one or more antennas and communicates with each antenna 20. The wireless communication terminal 30 including the plurality of antennas can also perform communication with the antennas 20 by SU-MIMO. The wireless communication terminal 30 may perform beamforming. Each wireless communication terminal 30 has a function of acquiring the position information of the own device, and acquires the position information of the own device at a request from the base station 10 or at a predetermined timing. Each wireless communication terminal 30 notifies the base station 10 of the acquired position information via the antenna 20.

As a method by which each wireless communication terminal 30 acquires the position information, any method of a global navigation satellite system (GNSS) such as a global positioning system (GPS), three-point positioning or one-point positioning using communication radio waves, sound wave positioning, visible light positioning, and the like may be used. In order to notify the base station 10 of the position information of each wireless communication terminal 30, wireless communication using another frequency band may be utilized.

Next, an outline of processing of the distributed antenna system 100 will be described using communication (downlink) from the base station 10 to the wireless communication terminal 30 as an example with reference to FIG. 1. In a case where spatial multiplexing transmission is simultaneously performed with respect to the plurality of wireless communication terminals 30 using the antennas 20 arranged in a distributed manner as in the distributed antenna system 100, the spatial correlation of a propagation path changes depending on the selection method of the wireless communication terminal 30. Accordingly, the communicable capacity and throughput also change depending on the selection of the wireless communication terminal 30. Therefore, in the distributed antenna system 100 according to the present embodiment, the wireless communication terminals 30 that are expected not to have a high spatial correlation are selected as the wireless communication terminals 30 for which spatial multiplexing is simultaneously performed on the basis of the position information of each wireless communication terminal 30. That is, in the distributed antenna system 100 according to the present embodiment, communication opportunities are allocated to the wireless communication terminals 30 that are not expected to have a high spatial correlation as targets for spatial multiplexing.

Specifically, in the distributed antenna system 100, with reference to the position information of selected one wireless communication terminal 30, the other wireless communication terminals 30 positioned within a range of a predetermined distance from the selected one wireless communication terminal 30 are excluded from the allocation target of the communication opportunities, whereby the close wireless communication terminals 30 having a high possibility of having a high spatial correlation are excluded from the selection candidates. In the example illustrated in FIG. 1, it is assumed that the wireless communication terminals 30-1 to 30-6 are located in the building BL, and the wireless communication terminal 30-5 and the wireless communication terminal 30-6 are the wireless communication terminals 30 to which the communication opportunities are allocated. An area 31-1 illustrated in FIG. 1 represents a range separated from the wireless communication terminal 30-5 a predetermined distance with reference to the position of the wireless communication terminal 30-5. Similarly, an area 31-2 illustrated in FIG. 1 represents a range separated from the wireless communication terminal 30-6 a predetermined distance with reference to the position of the wireless communication terminal 30-6.

The base station 10 excludes the other wireless communication terminals 30-3 and 30-4 located in the area 31-1 or the area 31-2 from the allocation target of the communication opportunities. This makes it possible to avoid a combination of the wireless communication terminals 30 having a high spatial correlation. As a result, it is possible to reduce spatial correlation between the wireless communication terminals 30 to be subjected to communication simultaneously by spatial multiplexing.

Further, in the distributed antenna system 100, the wireless communication terminal 30 having a low overlap ratio of the antennas 20 allocated to the wireless communication terminals 30 for which spatial multiplexing is performed is selected with reference to the information (hereinafter, referred to as "clustering information") regarding a set of antennas 20 allocated to each wireless communication terminal 30. The overlap ratio is obtained by, for example, a ratio of the number of the same antennas 20 allocated to different wireless communication terminals 30 among the total number of antennas allocated to each of the plurality of wireless communication terminals 30 (for example, two wireless communication terminals 30). Note that, in a case where the antenna 20 includes a plurality of sub-arrays 21, the overlap ratio is obtained by, for example, a ratio of the number of the same sub-arrays 21 allocated to different wireless communication terminals 30 among the total number of sub-arrays allocated to each of the two wireless communication terminals 30. As a result, it is possible to expect an increase in the number of stream allocations per terminal.

As described above, the base station 10 excludes the close wireless communication terminals 30 having a high possibility of having a high spatial correlation from the selection candidates, and allocates the communication opportunities to the plurality of wireless communication terminals 30 having a low overlap ratio of the antennas 20 allocated to the wireless communication terminals 30 for which spatial multiplexing is performed as a combination of the wireless communication terminals 30 with which spatial multiplexing transmission is performed. For example, in the example illustrated in FIG. 1, the base station 10 allocates communication opportunities to the wireless communication terminals 30-1, 30-2, 30-5, and 30-6 as a combination of the wireless communication terminals 30 with which spatial multiplexing transmission is performed.

By performing the above processing, with the distributed antenna system 100, it is possible to reduce spatial correlation in performing spatial multiplexing transmission and improve communication efficiency without acquiring CSI between all antennas. Hereinafter, specific configurations for achieving the above-described processing will be described.

Figure 2:
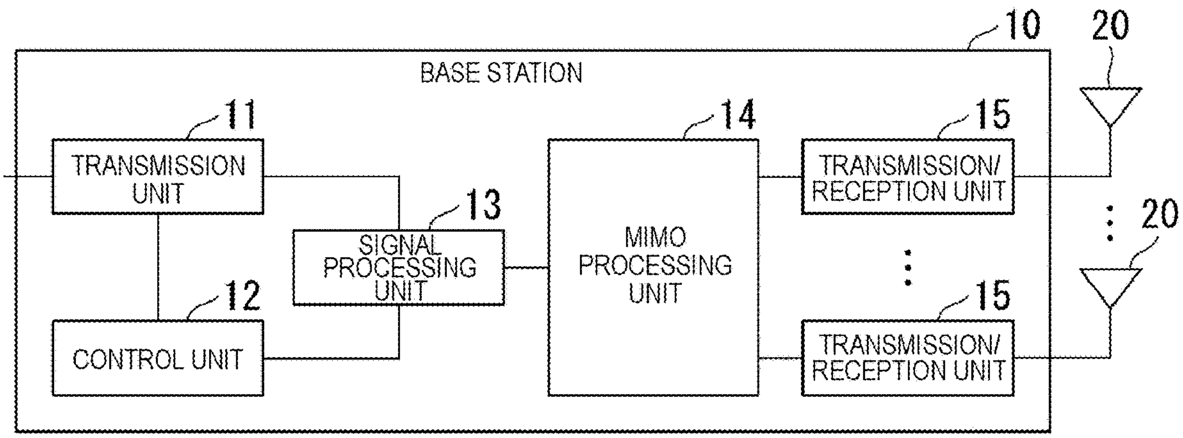
FIG. 2 A diagram illustrating a configuration example of a base station according to the present embodiment.

FIG. 2 is a diagram illustrating a configuration example of the base station 10 according to the present embodiment. The base station 10 includes a transmission unit 11, a control unit 12, a signal processing unit 13, a MIMO processing unit 14, a plurality of transmission/reception units 15, and a plurality of antennas 20.

The transmission unit 11 transmits a signal to and from a higher-level device on a network, another wireless communication device, or the like.

The control unit 12 controls the entire operation of the base station 10. For example, the control unit 12 performs scheduling such as allocation of each antenna 20 and each wireless communication terminal 30 for performing spatial multiplexing transmission.

The signal processing unit 13 performs signal processing related to wireless communication.

The MIMO processing unit 14 performs MIMO processing such as precoding and postcoding. Note that the MIMO processing unit 14 may perform control to perform analog beamforming or may perform control to perform hybrid beamforming instead of precoding or postcoding.

The transmission/reception unit 15 performs processing related to transmission and reception of radio signals. Specifically, the transmission/reception unit 15 controls each antenna 20 to communicate with each wireless communication terminal 30. For example, the transmission/reception unit 15 controls the antenna 20 allocated to the wireless communication terminal 30 (hereinafter referred to as "candidate terminal station") that is a candidate for performing spatial multiplexing by MU-MIMO, and performs communication with the candidate terminal station.

Figure 3:
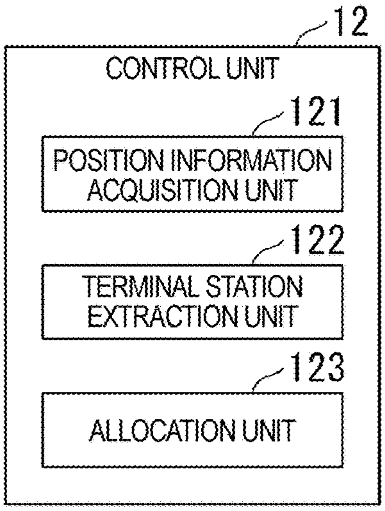
FIG. 3 A diagram illustrating a configuration example of a control unit according to the present embodiment.

FIG. 3 is a diagram illustrating a configuration example of the control unit 12 according to the present embodiment. The control unit 12 includes a position information acquisition unit 121, a terminal station extraction unit (extractor) 122, and an allocation unit (allocator) 123.

The position information acquisition unit 121 acquires position information from each of the plurality of wireless communication terminals 30.

The terminal station extraction unit 122 extracts a plurality of candidate terminal stations from among the plurality of wireless communication terminals 30. Depending on various types of scheduling, a method of extracting the candidate terminal stations may be any of a method of selecting the candidate terminal stations based on an index such as a rank indicator (RI), a method of selecting the candidate terminal stations based on a proportional fair (PF) standard, a method of selecting the candidate terminal stations based on reception power, and a method of selecting the wireless communication terminals 30 such that interference between the wireless communication terminals 30 is reduced by a positional relationship or the like. Examples of the method of selecting the candidate terminal stations based on the reception power include a method of checking reception power of each wireless communication terminal 30 and selecting wireless communication terminals 30 in order from wireless communication terminals 30 having higher reception power, and a method of selecting wireless communication terminals 30 having close reception power. The terminal station extraction unit 122 is an aspect of an extraction unit.

The allocation unit 123 allocates the antenna 20 to each wireless communication terminal 30 based on the reception quality, the terminal accommodation status, and the like in a phase in which the wireless communication terminal 30 that has entered the area (for example, the building BL) is connected to the base station 10. In a case where the antenna 20 is configured to include a plurality of sub-arrays 21, the allocation unit 123 allocates the sub-arrays 21 of the antenna 20 to each wireless communication terminal 30 based on the reception quality, the terminal accommodation status, and the like in the phase in which the wireless communication terminal 30 is connected to the base station 10. Note that the allocation unit 123 may allocate the antenna 20 that communicates with the candidate terminal station for each candidate terminal station extracted by the terminal station extraction unit 122. In addition, the plurality of antennas 20 or the sub-arrays 21 of the antenna 20 may be allocated to the wireless communication terminal 30. In a case where the antenna 20 is configured to include a plurality of sub-arrays 21, it is sufficient if the allocation unit 123 allocates the sub-array 21 that communicates with the candidate terminal station for each candidate terminal station extracted by the terminal station extraction unit 122.

Further, the allocation unit 123 allocates communication opportunities to two or more candidate terminal stations as targets for communication by spatial multiplexing. More specifically, the allocation unit 123 allocates communication opportunities, as targets for communication by spatial multiplexing, to two or more candidate terminal stations from among the plurality of candidate terminal stations extracted by the terminal station extraction unit 122 that satisfy a condition that a distance between the candidate terminal stations is equal to or greater than a first threshold and an overlap ratio of each antenna allocated to each candidate terminal station is less than a second threshold.

Figure 4:
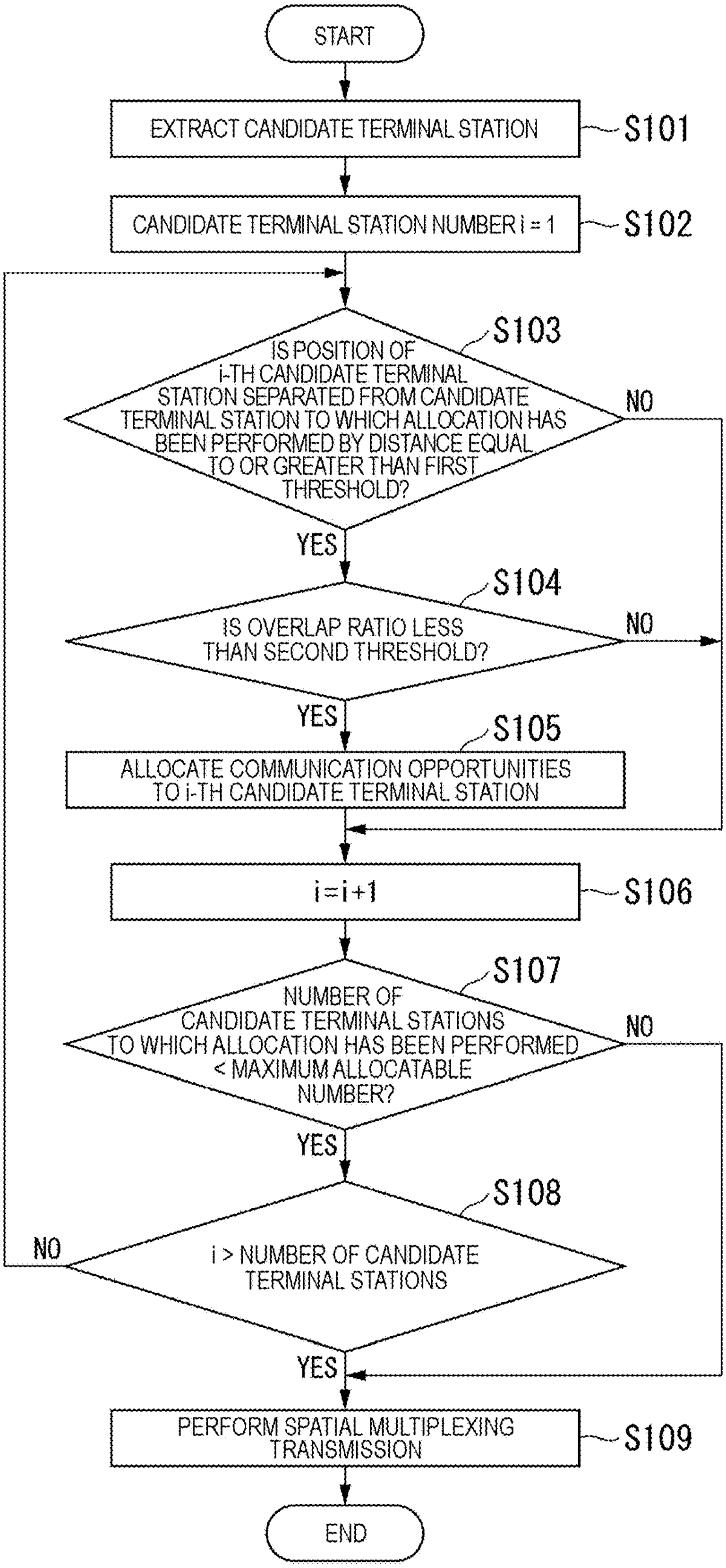
FIG. 4 A flowchart illustrating a flow of processing of the base station according to the present embodiment.

FIG. 4 is a flowchart illustrating a flow of processing of the base station 10 according to the present embodiment. Note that it is assumed that the base station 10 has acquired the position information of each wireless communication terminal 30 at the start of the processing of FIG. 4. For example, each wireless communication terminal 30 may transmit a connection request signal including the position information to the base station 10 so that the base station 10 acquires the position information of each wireless communication terminal 30. Further, at the start of the processing of FIG. 4, the antenna 20 is allocated for each wireless communication terminal 30, and the allocation unit 123 holds information regarding a set of one or more antennas 20 or one or more sub-arrays 21 allocated for each wireless communication terminal 30 as clustering information.

The terminal station extraction unit 122 extracts candidate terminal stations from among the plurality of wireless communication terminals 30 (step S101). The allocation unit 123 assigns a number to each extracted candidate terminal station. For example, the allocation unit 123 sequentially assigns numbers from 1 as candidate terminal station numbers to the candidate terminal stations. The allocation unit 123 substitutes 1 for a candidate terminal station number i (step S102).

Next, based on the position information of the i-th candidate terminal station and the position information of the candidate terminal station to which the communication opportunities have been allocated, the allocation unit 123 determines whether the position of the i-th candidate terminal station is separated from the position of the candidate terminal station to which the communication opportunities have been allocated a distance equal to or greater than the first threshold (step S103). At the start of processing, since i is 1, there is no candidate terminal station to which the communication opportunities have been allocated. Therefore, here, the allocation unit 123 determines that the position of the i-th candidate terminal station is separated from the position of the candidate terminal station to which the communication opportunities have been allocated a distance equal to or greater than the first threshold.

When determining that the position of the i-th candidate terminal station is separated from the position of the candidate terminal station to which the communication opportunities have been allocated a distance equal to or greater than the first threshold (step S103—YES), the allocation unit 123 determines whether or not the overlap ratio is less than the second threshold (step S104). Specifically, the allocation unit 123 first refers to the held clustering information for each candidate terminal station, and reads the clustering information of the i-th candidate terminal station and the clustering information of the candidate terminal station to which the communication opportunities have been allocated. Next, the allocation unit 123 compares the pieces of read clustering information to calculate the overlap ratio. Here, since i is 1, there is no candidate terminal station to which the communication opportunities have been allocated. Therefore, the allocation unit 123 determines that the overlap ratio is less than the second threshold.

When determining that the overlap ratio is less than the second threshold (step S104—YES), the allocation unit 123 allocates the communication opportunities to the i-th candidate terminal station (for example, the first candidate terminal station) (step S105). That is, the allocation unit 123 adds the i-th candidate terminal station to a target for spatial multiplexing. In a case where the allocation unit 123 determines that the overlap ratio is equal to or greater than the second threshold (step S104—NO) or after the processing of step S105, 1 is added to i (step S106). As a result, in a case where i=1, i=2 is obtained by the processing of step S106.

Thereafter, the allocation unit 123 determines whether the number of candidate terminal stations to which the communication opportunities have been allocated is less than the maximum allocatable number (step S107). The maximum allocatable number is determined according to, for example, the number of antennas 20, the number of sub-arrays 21, the processing capability of the base station 10, the corresponding number of maximum MIMO layers, or the like.

When determining that the number of candidate terminal stations to which the communication opportunities are allocated is less than the maximum allocatable number (step S107—YES), the allocation unit 123 determines whether the value of i is greater than the number of candidate terminal stations (step S108). That is, the allocation unit 123 determines whether or not an allocation determination has been made with respect to all the candidate terminal stations extracted in step S101.

When the allocation unit 123 determines that the value of i is not greater than the number of candidate terminal stations (step S108—NO), the allocation determination has not been performed with respect to all the candidate terminal stations extracted in step S101. Therefore, the allocation unit 123 executes the processing of step S103. Here, the processing of step S103 will be described assuming that i=2 and the communication opportunities have been allocated to the first candidate terminal station. Based on the position information of the second candidate terminal station and the position information of the candidate terminal station to which the communication opportunities have been allocated, the allocation unit 123 determines whether the position of the second candidate terminal station is separated from the position of the candidate terminal station to which the communication opportunities have been allocated a distance equal to or greater than the first threshold (step S103). Here, based on the position information of the second candidate terminal station and the position information of the first candidate terminal station, the allocation unit 123 determines whether the position of the second candidate terminal station is separated from the position of the first candidate terminal station a distance equal to or greater than the first threshold.

When determining that the position of the second candidate terminal station is not separated from the position of the first candidate terminal station a distance equal to or greater than the first threshold (step S103—NO), the allocation unit 123 adds 1 to i in the processing of step S106 and executes the processing of step S107.

On the other hand, in the processing of step S103, when determining that the position of the second candidate terminal station is separated from the position of the first candidate terminal station a distance equal to or greater than the first threshold (step S103—YES), the allocation unit 123 determines whether or not the overlap ratio is less than the second threshold (step S104). Specifically, the allocation unit 123 first refers to the held clustering information for each candidate terminal station, and reads the clustering information of the second candidate terminal station and the clustering information of the candidate terminal station to which the communication opportunities have been allocated (for example, the first candidate terminal station). Next, the allocation unit 123 compares the pieces of read clustering information to calculate the overlap ratio.

When determining that the overlap ratio is less than the second threshold (step S104—YES), the allocation unit 123 allocates the communication opportunities to the i-th candidate terminal station (for example, the second candidate terminal station) (step S105). That is, the allocation unit 123 adds the i-th candidate terminal station to a target for spatial multiplexing. In a case where the allocation unit 123 determines that the overlap ratio is equal to or greater than the second threshold (step S104—NO) or after the processing of step S105, 1 is added to i (step S106).

Note that when i=3 and the communication opportunities are allocated to each of the first candidate terminal station and the second candidate terminal station, the allocation unit 123 determines whether the position of the third candidate terminal station is separated from the position of the candidate terminal station (for example, the first candidate terminal station and the second candidate terminal station) to which the communication opportunities have been allocated a distance equal to or greater than the first threshold in the processing of step S103.

Further, when determining that the position of the third candidate terminal station is separated from the position of the candidate terminal station (for example, the first candidate terminal station and the second candidate terminal station) to which the communication opportunities have been allocated a distance equal to or greater than the first threshold in the processing of step S103, the allocation unit 123 determines whether or not the overlap ratio is less than the second threshold in the processing of step S104. Specifically, the allocation unit 123 first refers to the held clustering information for each candidate terminal station, and reads the clustering information of the third candidate terminal station and the clustering information of the candidate terminal station to which the communication opportunities have been allocated (for example, the first candidate terminal station and the second candidate terminal station). Next, the allocation unit 123 compares the pieces of read clustering information to calculate the overlap ratio. As described above, as the number of candidate terminal stations to which the communication opportunities have been allocated increases, the number of targets to be compared increases.

In the processing of step S107, when the allocation unit 123 determines that the number of candidate terminal stations to which the communication opportunities are allocated is equal to or greater than the maximum allocatable number (step S107—NO), the base station 10 executes spatial multiplexing transmission with the candidate terminal station added as a target for spatial multiplexing (step S109).

In the processing of step S108, when the allocation unit 123 determines that the value of i is greater than the number of candidate terminal stations (step S108—YES), the allocation determination has been performed with respect to all the candidate terminal stations extracted in step S101. In this case, the base station 10 executes spatial multiplexing transmission with the candidate terminal station added as a target for spatial multiplexing (step S109). In this manner, the base station 10 repeatedly performs the processing illustrated in FIG. 4 until the maximum allocatable number of candidate terminal stations is reached or there is no candidate terminal station that is a candidate for spatial multiplexing. Note that when there is no candidate terminal station that is a candidate for spatial multiplexing and the maximum allocatable number is not satisfied, the base station 10 may newly add a candidate terminal station that is a candidate for spatial multiplexing.

With the distributed antenna system 100 configured as described above, it is possible to reduce spatial correlation in performing spatial multiplexing transmission and improve communication efficiency without acquiring CSI between all antennas. Specifically, in the distributed antenna system 100, the base station 10 includes: the terminal station extraction unit 122 that extracts the plurality of candidate terminal stations from among the plurality of wireless communication terminals 30; and the allocation unit 123 that allocates communication opportunities, as targets for communication by spatial multiplexing, to two or more candidate, second communication devices from among the plurality of extracted candidate terminal stations that satisfy the condition that the distance between the candidate terminal stations is equal to or greater than the first threshold and the overlap ratio of each antenna allocated to each candidate, second communication device is less than the second threshold, and each antenna 20 allocated to the two or more candidate terminal stations to which the communication opportunities have been allocated among the plurality of antennas 20 performs spatial multiplexing transmission with respect to the two or more candidate terminal stations. In this manner, it is possible to reduce spatial correlation between the wireless communication terminals 30 to be subjected to communication simultaneously by spatial multiplexing, and it is possible to reduce the probability of overlapping of the antennas 20 to which streams are allocated at the same time, and to increase the number of allocated streams per terminal. Therefore, it is possible to reduce spatial correlation in performing spatial multiplexing transmission and improve communication efficiency without acquiring CSI between all antennas.

Further, in the distributed antenna system 100, it is also possible to expect that a processing load is alleviated by avoiding interference between wireless communication terminals only by analog beamforming without performing precoding or postcoding processing in a high frequency band.

Modifications of the distributed antenna system 100 will be described.

Modification 1

Each functional unit included in the base station 10 may be arranged by being divided into a centralized unit (CU), a distributed unit (DU), and a radio unit (RU) in 5G NR. In such a configuration, for example, the transmission unit 11 is arranged in the CU, the control unit 12, the signal processing unit 13, and the MIMO processing unit 14 are arranged in the DU, and the transmission/reception unit 15 and the antenna 20 are arranged in the RU.

Modification 2

Although the configuration in the case of a downlink from the base station 10 to the wireless communication terminal 30 has been described in the above embodiment, the above processing in the distributed antenna system 100 is also applicable to an uplink from the wireless communication terminal 30 to the base station 10. For example, the distributed antenna system 100 may perform MU-MIMO by simultaneously transmitting a plurality of streams from the plurality of wireless communication terminals 30 to the plurality of antennas 20.

Modification 3

The base station 10 may consider not only spatial correlation but also other factors such as fairness of communication opportunities and a traffic amount in scheduling, and may perform scheduling control in consideration of the position information of the wireless communication terminals and/or the clustering information.

(Regarding Correspondence Relationship with Claims)

The base station 10 is an aspect of a first communication device, a second communication device, and a wireless communication device. The wireless communication terminal 30 is an aspect of a first communication device, a second communication device, and a wireless communication device. When the base station 10 is the first communication device, the wireless communication terminal 30 is the second communication device, and when the base station 10 is the second communication device, the wireless communication terminal 30 is the first communication device.

Some or all of the functional units of the base station 10 and the wireless communication terminal 30 in the embodiment described above are achieved as software by one or more processors such as a central processing unit (CPU) executing a program stored in a storage device including a nonvolatile recording medium (non-transitory recording medium) and a memory. The program may be recorded in a computer-readable non-transitory recording medium. The computer-readable non-transitory recording medium is a non-transitory recording medium such as a portable medium including, for example, a flexible disk, a magneto-optical disk, read only memory (ROM), and a compact disc-ROM (CD-ROM) or a storage device such as a hard disk built in a computer system.

Some or all of the functional units of the base station 10 and the wireless communication terminal 30 may be achieved by using, for example, hardware including an electronic circuit (or circuitry) by using a large scale integrated circuit (LSI), an application specific integrated circuit (ASIC), a programmable logic device (PLD), a field programmable gate array (FPGA), or the like.

As described above, the embodiment of this invention has been described in detail with reference to the drawings; however, specific configurations are not limited to the embodiment and include designs or the like without departing from the gist of this invention.

INDUSTRIAL APPLICABILITY

The present invention can be applied to a wireless communication system using MIMO.

REFERENCE SIGNS LIST

10 Base station
20 Antenna
21 Sub-array
30 Wireless communication terminal
11 Transmission unit
12 Control unit
13 Signal processing unit
14 MIMO processing unit
15 Transmission/reception unit
121 Position information acquisition unit
122 Terminal station extraction unit
123 Allocation unit

The invention claimed is:

1. A distributed antenna system comprising a first communication device and a plurality of antennas that communicates with a plurality of second communication devices by spatial multiplexing under control of the first communication device, the first communication device including an extractor configured to extract a plurality of candidate, second communication devices that are candidates for spatial multiplexing among the plurality of second communication devices; and an allocator configured to allocate communication opportunities, as targets for communication by spatial multiplexing, to two or more candidate, second communication devices from among the plurality of extracted candidate, second communication devices that satisfy a condition that a distance between the candidate, second communication devices is equal to or greater than a first threshold and an overlap ratio of each antenna allocated to each candidate, second communication device is less than a second threshold, wherein each antenna allocated to the two or more candidate, second communication devices to which the communication opportunities have been allocated among the plurality of antennas performs spatial multiplexing transmission with respect to the two or more candidate, second communication devices.

2. The distributed antenna system according to claim 1, wherein the first communication device further includes a position information acquirer configured to acquire position information from each of the plurality of second communication devices, and the allocator determines whether or not the distance between the candidate, second communication devices is equal to or greater than the first threshold based on position information of each candidate, second communication device acquired by the position information acquirer.

3. The distributed antenna system according to claim 1, wherein the allocator calculates, as the overlap ratio, a ratio of a number of same antennas allocated to different candidate, second communication devices among a total number of antennas allocated to each candidate, second communication device.

4. A wireless communication method in a distributed antenna system including a first communication device and a plurality of antennas that communicates with a plurality of second communication devices by spatial multiplexing under control of the first communication device, wherein the first communication device extracts a plurality of candidate, second communication devices that is candidates for spatial multiplexing among the plurality of second communication devices, and allocates communication opportunities, as targets for communication by spatial multiplexing, to two or more candidate, second communication devices from among the plurality of extracted candidate, second communication devices that satisfy a condition that a distance between the candidate, second communication devices is equal to or greater than a first threshold and an overlap ratio of each antenna allocated to each candidate, second communication device is less than a second threshold, and each antenna allocated to the two or more candidate, second communication devices to which the communication opportunities have been allocated among the plurality of antennas performs spatial multiplexing transmission with respect to the two or more candidate, second communication devices.

5. A wireless communication device comprising:

a plurality of antennas configured to perform spatial multiplexing transmission with respect to a plurality of communication devices;

an extractor configured to extract a plurality of candidate communication devices that are candidates for spatial multiplexing among the plurality of communication devices; and an allocator configured to allocate communication opportunities, as targets for communication by spatial multiplexing, to two or more candidate communication devices from among the plurality of extracted candidate communication devices that satisfy a condition that a distance between the candidate communication devices is equal to or greater than a first threshold and an overlap ratio of each antenna allocated to each candidate communication device is less than a second threshold, wherein each antenna allocated to the two or more candidate communication devices to which the communication opportunities have been allocated among the plurality of antennas performs spatial multiplexing transmission with respect to the two or more candidate communication devices.

* * * * *